G. W. Kintz,
Wash-Board,
Nº 76,924. Patented Apr. 21, 1868.

Witnesses:
J. P. Davis
W. J. Creelman

Inventor:
G. W. Kintz
By J. Fraser & Co.
Attys

United States Patent Office.

GEORGE W. KINTZ, OF WEST HENRIETTA, NEW YORK.

Letters Patent No. 76,924, dated April 21, 1868.

IMPROVED WASHING AND WRINGING-MACHINE.

*The Schedule referred to in these Letters Patent and making part of the same.*

TO ALL WHOM IT MAY CONCERN:

Be it known that I, GEORGE W. KINTZ, of West Henrietta, in the county of Monroe, and State of New York, have invented a certain new and useful Improvement in Combined Washing and Wringing-Machines; and I do hereby declare that the following is a full and exact description thereof, reference being had to the accompanying drawings, making part of this specification.

Figure 1:
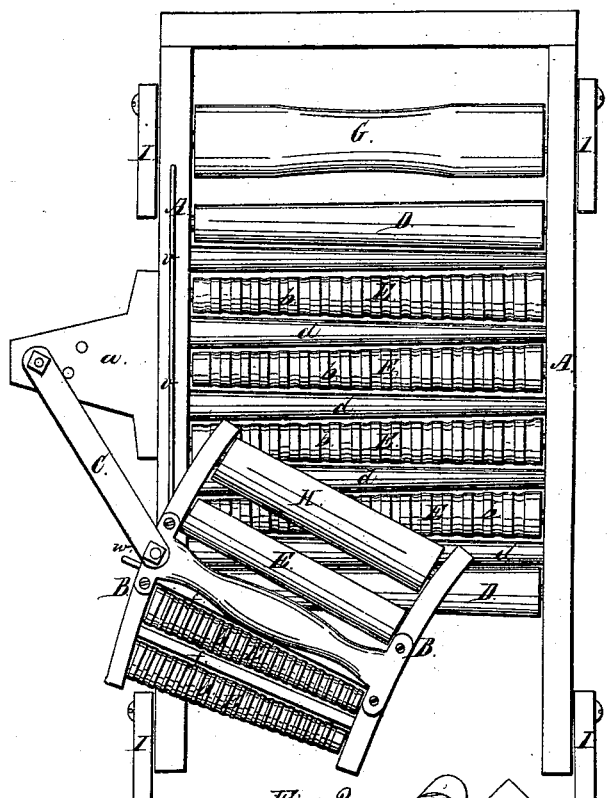
Figure 2:
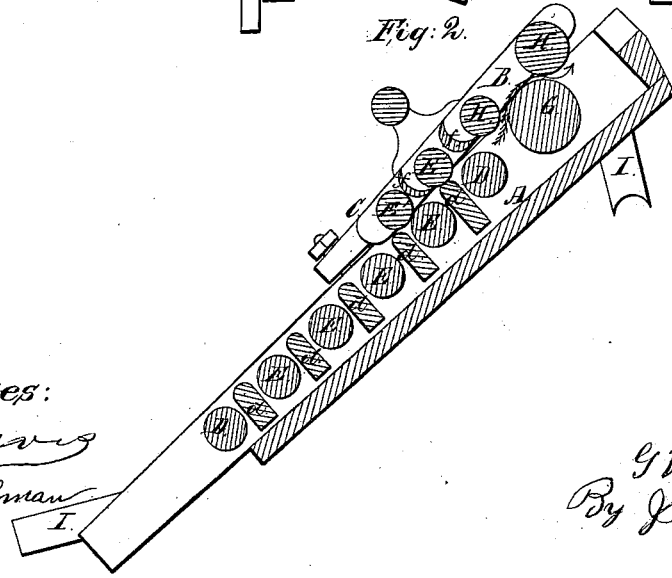

Figure 1 is a front view, and
Figure 2 a longitudinal section.

My invention consists in constructing the bed and rubber with conical corrugated rollers, standing in opposite directions, so as to produce a crimping of the cloth in working, and with intermatening rollers, giving a graduated degree of pressure in wringing, all as hereinafter set forth.

In the drawings, A represents the bed, B the rubber, and C a double-jointed arm connecting therein, the latter being changeable to different positions in the bearing $a$; or, preferably, instead of this connection, an eye, $w$, of the rubber may run up on a rod, $v$, of the bed, as shown.

The bed is provided with a series of conical rollers, D D, E E E E, the extremes, D D, being plain, while the intermediate ones, E E, are ribbed or corrugated, as shown at $b\ b$, fig. 1.

The rubber is also provided with two cylindrical plain rollers H H on one side, and two corrugated conical rollers E' E', similar to E E on the other.

The conical rollers E of the bed and E' of the rubber point in opposite directions, as shown.

Between the rollers of the bed are placed vertical ribs $d\ d$, leaving a little space at the bottom for the escape of the water. Between the corrugated rollers of the rubber are also placed curved scoops $f\ f$.

The action of the washing-arrangement above described is as follows: The clothes are placed upon the bed and the rubber worked over them. The tendency of the conical rollers of the bed is to work the clothes one way, and the tendency of the conical rollers of the rubber to work them the other way. This is caused by the angular rolling of the rubber on the bed, by the contact of the large ends of one set of the rollers with the small ends of the other set. This action is such that the grooves $b\ b$ of both sets of rollers cross each other angularly, and work the clothes up into fine crimps or flutes, thereby making the whole so porous or open that the water can easily penetrate and come in contact with every portion of the cloth.

Simple, plain, cylindrical, or even conical rollers will not accomplish this same effect; for, though the side action may be attained by the latter, the crimping effect cannot be attained without combining the corrugations of the rollers with cone shape. This effect I claim to be novel in my machine.

The ribs $d$ serve to retain the water in contact with the rollers, and also serve as rubbers to assist the action of the rollers. The scoops $f$, by their concave form, serve to draw up the water in the back action of the rubber, and also serve as rubbers in conjunction with rollers E' E'.

Near the upper end of the bed is situated a large roller, G, preferably made of rubber. This roller is employed in conjunction with rollers H H for a wringer, as follows: The rubber is raised sufficiently to allow the placing of the clothes upon the large roller. The rubber is then pressed down upon the clothes with the two rollers H H striding the roller G, and the clothes are then drawn through, effectually expressing the water. The peculiar position of the rollers facilitates the action, for the inner roller H stands a greater distance from G than the outer one, thereby giving the initial pressure and removing the great weight of water, while the outer roller then, by its closer pressure, finishes the action.

Bearings I I are secured to the sides of the wash-boards, both at top and bottom, those at the top resting on the edge of the tub to support the board, and those at the bottom resting against the inside of the tub to stay it.

I do not claim broadly a hand-rubber combined with a wash-board, as I am aware that the same has been used in many cases; neither do I claim broadly a wringer combined with a washing-machine; but

What I claim as my invention, and desire to secure by Letters Patent, is—

The combined washing and wringing-machine, having the conical crimping-rollers E E⁴, standing in opposite directions to produce a crimping of the cloth, and provided with the intermediate ribs and scoops $d, f$, and having the wringing-rollers G, H H so arranged as to intermatch and graduate the pressure, the whole operating as described, and for the purpose specified.

In witness whereof, I have hereunto signed my name in the presence of two subscribing witnesses.

GEO. W. KINTZ.

Witnesses:
    R. F. OSGOOD,
    J. A. DAVIS.